United States Patent
Kim

(10) Patent No.: US 11,164,328 B2
(45) Date of Patent: Nov. 2, 2021

(54) OBJECT REGION DETECTION METHOD, OBJECT REGION DETECTION APPARATUS, AND NON-TRANSITORY COMPUTER-READABLE MEDIUM THEREOF

(71) Applicant: PINTEL Inc., Seoul (KR)

(72) Inventor: Dong Key Kim, Seoul (KR)

(73) Assignee: PINTEL Inc., Seoul (KR)

( * ) Notice: Subject to any disclaimer, the term of this patent is extended or adjusted under 35 U.S.C. 154(b) by 327 days.

(21) Appl. No.: 16/190,763

(22) Filed: Nov. 14, 2018

(65) Prior Publication Data
US 2020/0098132 A1 Mar. 26, 2020

(30) Foreign Application Priority Data
Sep. 20, 2018 (KR) .......................... 10-2018-0112606

(51) Int. Cl.
| | |
|---|---|
| *G06K 9/00* | (2006.01) |
| *G06T 7/73* | (2017.01) |
| *H04N 19/91* | (2014.01) |
| *H04N 19/176* | (2014.01) |
| *H04N 19/513* | (2014.01) |
| *H04N 19/124* | (2014.01) |

(52) U.S. Cl.
CPC .............. *G06T 7/73* (2017.01); *H04N 19/124* (2014.11); *H04N 19/176* (2014.11); *H04N 19/521* (2014.11); *H04N 19/91* (2014.11)

(58) Field of Classification Search
None
See application file for complete search history.

(56) References Cited

U.S. PATENT DOCUMENTS

| 7,095,786 B1* | 8/2006 | Schonfeld | H04N 19/51 375/240.16 |
|---|---|---|---|
| 2011/0228092 A1* | 9/2011 | Park | H04N 19/61 348/154 |
| 2014/0147012 A1* | 5/2014 | Park | H04N 19/513 382/107 |
| 2014/0247876 A1* | 9/2014 | Moriya | H04N 19/176 375/240.12 |
| 2019/0141335 A1* | 5/2019 | Nishi | H04N 19/139 |

OTHER PUBLICATIONS

Poppe, Chris, et al. "Moving object detection in the H. 264/AVC compressed domain for video surveillance applications." Journal of Visual Communication and Image Representation 20.6 (2009): 428-437. (Year: 2009).*

Gomila, Cristina, and Peng Yin. "New features and applications of the H. 264 video coding standard." International Conference on Information Technology: Research and Education, 2003. Proceedings. ITRE2003.. IEEE, 2003. (Year: 2003).*

* cited by examiner

*Primary Examiner* — Sean M Conner
(74) *Attorney, Agent, or Firm* — Studebaker & Brackett PC

(57) ABSTRACT

The present invention relates to an object region detection method, an object region detection apparatus, and a non-transitory computer-readable medium thereof, and more particularly, to an object region detection method, an object region detection apparatus, and a non-transitory computer-readable medium thereof, capable of further accelerating analysis of object recognition and tracking by preliminarily detecting an object region based on a parameter value obtained from an image decoding process and referring to the detected object region for image analysis.

15 Claims, 13 Drawing Sheets

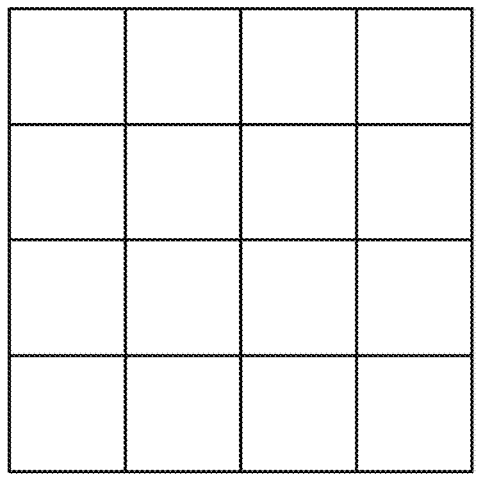
FIG. 8A
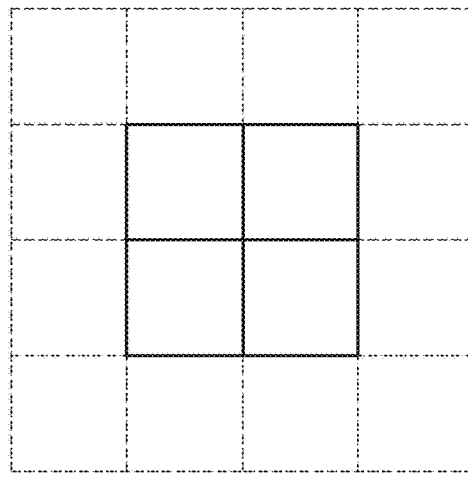
DETERMINATION BY FIRST DETERMINATION UNIT
FIG. 8B
DETERMINATION BY FIRST DETERMINATION UNIT
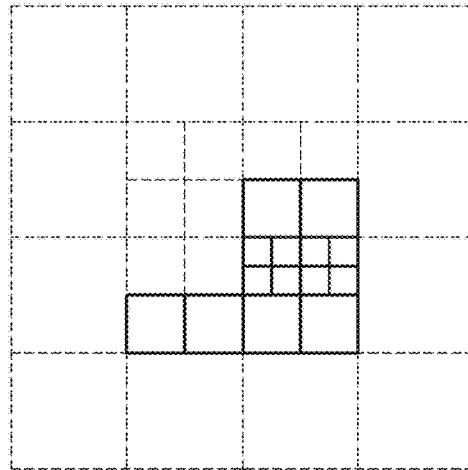
FIG. 8C
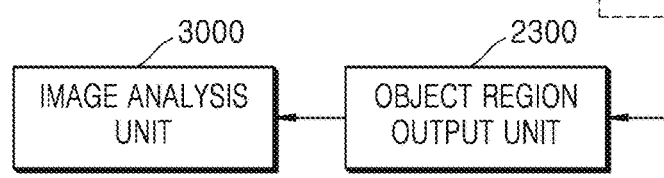

FIG. 13A

| I | P | P | P | P | P | P | P | P | P | P | I | P | P | P | P | P | P | P | ... |

FIG. 13B

| I | P | P | P | P | P | P | P | B | P | I | P | P | P | P | P | P | P | ... |

FIG. 13C

| I | B | B | P | B | B | P | B | B | P | B | B | I | B | B | P | ... |

OBJECT REGION DETECTION METHOD, OBJECT REGION DETECTION APPARATUS, AND NON-TRANSITORY COMPUTER-READABLE MEDIUM THEREOF

BACKGROUND OF THE INVENTION

1. Field of the Invention

The present invention relates to an object region detection method, an object region detection apparatus, and a non-transitory computer-readable medium thereof, and more particularly, to an object region detection method, an object region detection apparatus, and a non-transitory computer-readable medium thereof, capable of further accelerating analysis of object recognition and tracking by preliminarily detecting an object region based on a parameter value obtained from an image decoding process and referring to the detected object region for image analysis.

2. Description of the Related Art

In recent years, image data collected from smart phones, CCTVs, black boxes, high-definition cameras or the like is rapidly increasing. Accordingly, requirements for recognizing a person or an object based on unstructured image data to extract meaningful information, and visually analyzing and utilizing the content are being increased.

Image data analysis technologies refer to all sorts of technologies for learning and analyzing such various images to search for a desired image or recognize situations such as occurrence of events.

However, a technology of recognizing, analyzing, and tracking image data is an algorithm which requires a considerable amount of calculation, that is, the complexity is high, so that a considerable load is applied to a computing device as a size of the image data becomes greater. Accordingly, it takes more time to analyze the image data having the greater size. Therefore, there is a constant demand for a method for reducing a time required for analyzing image information.

Meanwhile, as the security awareness is strengthened due to terrorism or the like in recent years, an image security market has been continuously growing, and accordingly, a demand for intelligent image processing is increasing.

Recently, a technology for efficiently compressing, transmitting, and checking high-resolution images have spread based on block-based video codecs according to a protocol such as H.264. Such high-resolution images are applied to monitoring images of a CCTV or the like. However, in analysis and tracking of such high-resolution images, as the resolution of an image increases, a conventional object detection method requires a higher amount of computation, so that a real-time image may not be smoothly analyzed.

Meanwhile, Related document 1 (Korean Patent Registration No. 10-1409826, registered on Jun. 13, 2014) discloses a technology of calculating a motion vector of a reference frame based on a histogram of motion vectors of blocks in the reference frame, and determining a region type of a reference block based on a global motion vector.

However, in a case of Related document 1, since the motion vector has to be calculated for an entire region, and histogram data has to be calculated for the entire region, it is difficult to obtain a speed which allows real-time processing in a current high-resolution image. In addition, since the motion vector has to be considered for all blocks, a computation has to be performed once for an unnecessary block.

In addition, when only the motion vector is a consideration as described in Related document 1, accurate detection of an object region may be difficult. Therefore, in the case of Related document 1, in order to accurately determine the object region, features in the image have to be computed again, so that it is practically difficult to analyze the high-resolution image rapidly and accurately.

SUMMARY OF THE INVENTION

An object of the present invention is to provide an object region detection method, an object region detection apparatus, and a non-transitory computer-readable medium thereof, capable of further accelerating analysis of object recognition and tracking by receiving a bit stream of a compressed image from a camera to extract data which can be used for object region detection, object recognition, and tracking, preliminarily detecting an object region based on extracted parameters, and referring to the detected object region for image analysis.

To achieve the objects described above, according to one embodiment of the present invention, there is provided an object region detection method performed in a computing system including at least one processor and a main memory for storing instructions which are executable by the processor, the object region detection method including: an image decoding step of decoding an image by performing a variable length decoding step, an inverse quantization step, an inverse transform step, and an adding step on image data; and an object region detection step of obtaining object region information of the image based on data size information for a macroblock included in the image data and at least one image decoding parameter extracted in the image decoding step.

In one embodiment of the present invention, the object region detection step may include: a first determination step including extracting the data size information for the macroblock from image data existing before the variable length decoding step is performed, and determining whether the data size information for the macroblock satisfies a predetermined criterion; and a second determination step of detecting an object region based on the at least one image decoding parameter extracted in the image decoding step for the macroblock having the data size information which is determined as to satisfy the predetermined criterion in the first determination step.

In one embodiment of the present invention, the second determination step may include: detecting the object region based on the at least one image decoding parameter for an entire macroblock when the macroblock does not include a sub-block; and detecting the object region based on the at least one image decoding parameter for the sub-block when the macroblock includes the sub-block.

In one embodiment of the present invention, the at least one image decoding parameter may include block size information of the macroblock or a sub-block constituting the macroblock.

In one embodiment of the present invention, the block size information may be obtained from information decoded in the variable length decoding step.

In one embodiment of the present invention, the at least one image decoding parameter may include motion vector information of the macroblock or a sub-block constituting the macroblock.

In one embodiment of the present invention, the motion vector information may be obtained from information decoded in the variable length decoding step.

In one embodiment of the present invention, the at least one image decoding parameter may include prediction error information of the macroblock or a sub-block constituting the macroblock.

In one embodiment of the present invention, the prediction error information may be obtained in the adding step, and the prediction error information may be obtained based on a difference between color information based on decoded image data for the macroblock or the sub-block constituting the macroblock and color information for the macroblock or the sub-block constituting the macroblock predicted in a prediction step performed in the adding step.

In one embodiment of the present invention, the object region detection step may include obtaining the object region information based on block size information, motion vector information, and prediction error information for a target block.

In one embodiment of the present invention, the object region detection step may include obtaining the object region information by collecting evaluation results of the block size information, the motion vector information, and the prediction error information for the target block.

To achieve the objects described above, according to one embodiment of the present invention, there is provided an object region detection method performed in a computing system including at least one processor and a main memory for storing instructions which are executable by the processor, the object region detection method including: an image decoding step of decoding an image by performing a variable length decoding step, an inverse quantization step, an inverse transform step, and an adding step on image data; and an object region detection step of obtaining object region information by at least one of block size information, motion vector information, and prediction error information of a macroblock or a sub-block constituting the macroblock when data size information for the macroblock included in the image data satisfies a predetermined criterion.

To achieve the objects described above, according to one embodiment of the present invention, there is provided an object region detection apparatus including at least one processor and a main memory for storing instructions which are executable by the processor, the object region detection apparatus including: an image decoding unit including a variable length decoding unit, an inverse quantization unit, an inverse transform unit, and an adder unit for performing a variable length decoding step, an inverse quantization step, an inverse transform step, and an adding step on image data, respectively, to decode an image; and an object region detection unit for obtaining object region information of the image based on data size information for a macroblock included in the image data and at least one image decoding parameter extracted by the image decoding unit.

To achieve the objects described above, according to one embodiment of the present invention, there is provided a non-transitory computer-readable medium, wherein the non-transitory computer-readable medium stores instructions which allow a computing device to execute: an image decoding step of decoding an image by performing a variable length decoding step, an inverse quantization step, an inverse transform step, and an adding step on image data; and an object region detection step of obtaining object region information of the image based on data size information for a macroblock included in the image data and at least one image decoding parameter extracted in the image decoding step.

According to one embodiment of the present invention, the object region is detected in advance to perform image analysis only on the detected object region when an object is recognized, tracked, traced, or identified from encoded image data, so that an image can be processed at a higher speed.

According to one embodiment of the present invention, unnecessary macroblocks are primarily and selectively removed when the object region is detected before the image analysis, so that the amount of computation for detecting the object region can be reduced, and an overall computation speed of a system can be increased.

According to one embodiment of the present invention, when the object region is detected, an object region determined as to have an object with a considerably high level of accuracy can be detected with a minimum amount of computation.

According to one embodiment of the present invention, since a parameter generated in a decoding process by a decoder unit for decoding the image data is used without changing a configuration of the decoder unit, even if a codec is changed, a codec scheme using blocks according to a protocol such as H.264 can be easily applied.

BRIEF DESCRIPTION OF THE DRAWINGS

FIGS. 8A to 8C are views illustrating a process of an object region detection step based on blocks according to one embodiment of the present invention.

FIGS. 13A to 13C are views schematically showing examples of frames of the image data.

DETAILED DESCRIPTION OF THE INVENTION

Figure 1:
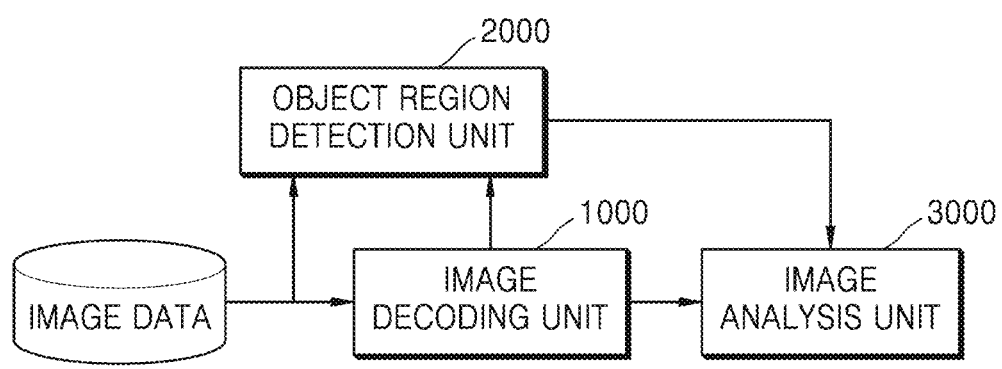
FIG. 1 is a view schematically showing an overall structure of an object region detection system according to one embodiment of the present invention.

Hereinafter, various embodiments are described with reference to the drawings, wherein like reference numerals refer to like elements throughout the drawings. In this specification, various descriptions are given to provide an understanding of the present invention. It is apparent, however, that such embodiments may be practiced without the specific details. In other examples, well-known structures and devices are provided in the form of a block diagram in order to facilitate describing embodiments.

The terms such as "component", "module", "system", and "unit" used herein refer to execution of a computer-related entity, hardware, firmware, software, a combination of software and hardware, or software. For example, a component may be a process executed on a processor, a processor, an object, an execution thread, a program, and/or a computer, but is not limited thereto. For example, both a computing device and an application executed by the computing device may be a component. One or more components may reside within a processor and/or an execution thread, and one component may be localized within a single computer or distributed among two or more computers. In addition, such components may execute from various computer-readable media having various data structures stored in the components. The components may communicate via local and/or remote processes, for example, according to a signal having one or more data packets (e.g., data communicated through another system and a network such as the Internet through data and/or a signal from one component interacting with another component in a local system or a distributed system).

In addition, the terms "comprises" and/or "comprising" indicate the presence of corresponding features and/or elements, but do not exclude the presence or addition of one or more other features, components, and/or groups thereof.

In addition, although any of the terms including ordinal numbers such as "first" or "second" may be used herein to describe various elements, the elements should not be limited by the terms. The terms are only used to distinguish one element from another. For example, a first element could be termed as a second element, and, similarly, a second element could be termed as a first element, without departing from the scope of the present invention. The term "and/or" includes any combination of a plurality of disclosed items related thereto, or one of a plurality of disclosed items related thereto.

In addition, in embodiments of the present invention, unless otherwise defined, all terms including technical terms and scientific terms used herein have the same meaning as how they are generally understood by those of ordinary skill in the art to which the invention pertains. Any terms that are defined in a general dictionary shall be construed to have the same meaning in the context of the relevant art, and, unless otherwise defined explicitly in the embodiments of the present invention, shall not be interpreted to have an idealistic or excessively formalistic meaning.

FIG. 1 is a view schematically showing an overall structure of an object region detection system according to one embodiment of the present invention.

An object region detection system in FIG. 1 includes an object region detection unit 2000, an image decoding unit 1000, and an image analysis unit 3000 in a broad sense to process received image data. The image data is image data encoded by a protocol codec, preferably, image data obtained by encoding an image by using a variable size block, and preferably, image data encoded according to a protocol including an H.264 codec scheme. More preferably, the image data is image data encoded according to a protocol using a variable size block.

The image data may be an image stored in the object region detection system or may be image data received by another image collection device (e.g., a CCTV or a monitoring device) in real time.

The image decoding unit 1000 is a device for decoding an image encoded according to the protocol including the H.264 codec scheme, and is configured according to a decoding scheme of a corresponding codec.

The image analysis unit 3000 may perform analysis such as object recognition, tracking, and identification with respect to a decoded and received image, and the image analysis unit 3000 may include various components such as a preprocessing unit, a feature information extraction unit, and a feature information analysis unit according to a purpose of image analysis.

According to the present invention, in order to further improve an image processing speed of the image analysis unit 3000, the object region detection unit 2000 is introduced. The object region detection unit 2000 may detect an object region through information on image data which is not decoded and parameter information extracted in a decoding process, such as information extracted from the image data and image decoding parameters extracted in the course of an image decoding process of the image decoding unit 1000, without detecting the object region through the decoded image itself. In addition, the object region detection unit 2000 may transmit object region information on the object region to the image analysis unit 3000.

Therefore, the image analysis unit 3000 does not perform object recognition, feature point extraction, preprocessing and the like on an entire image, but may perform the image analysis only on a region of the image according to the object region information received from the object region detection unit 2000.

The object region detection unit 2000, the image decoding unit 1000, and the image analysis unit 3000 may be configured as a single computing device, or may be configured by two or more computing devices.

In other words, the object region detection system according to the present invention may be implemented by a computing system that includes at least one processor and a main memory for storing instructions which are executable by the processor.

Figure 2:
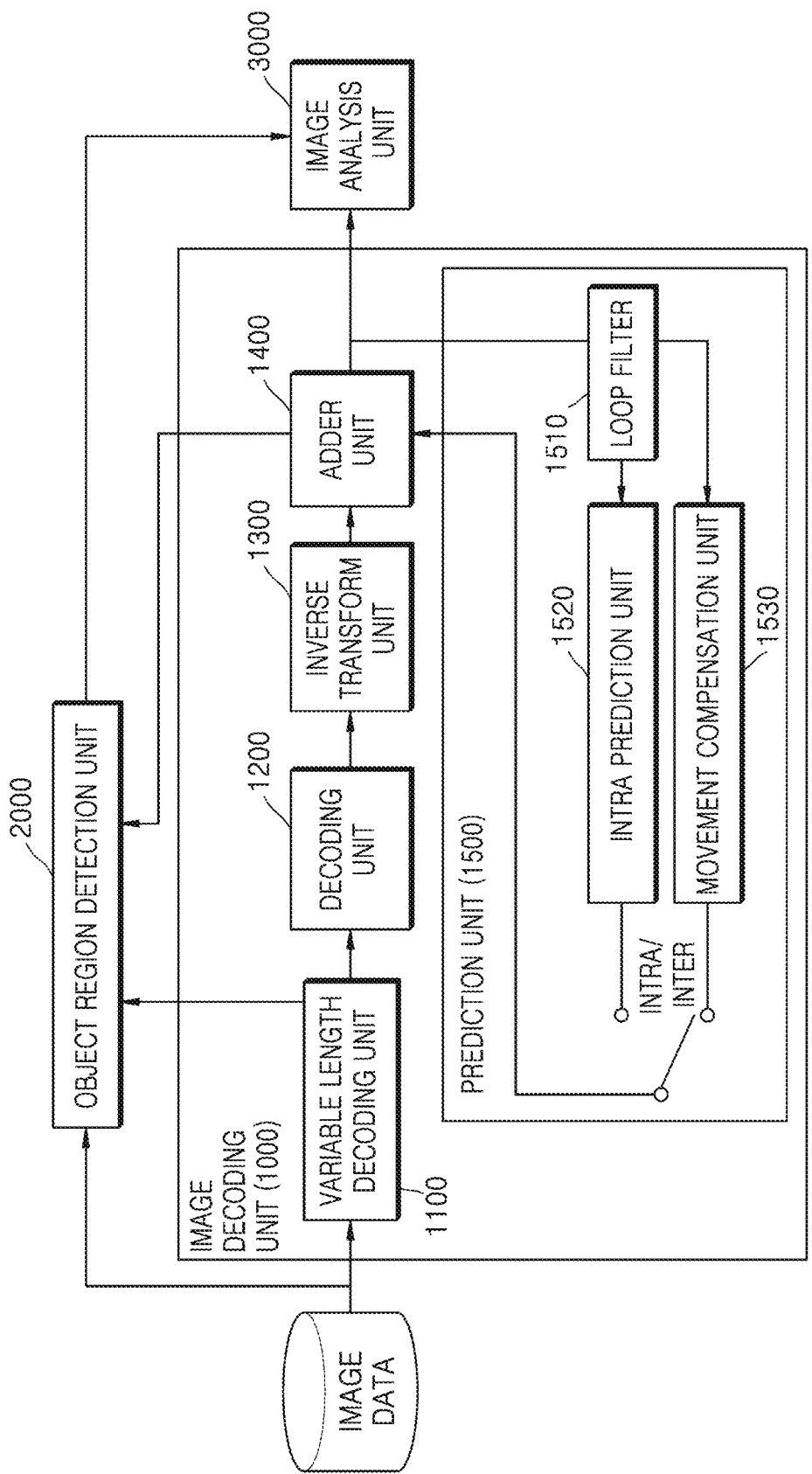
FIG. 2 is a view schematically showing a detailed configuration of the object region detection system according to one embodiment of the present invention.

FIG. 2 is a view schematically showing a detailed configuration of the object region detection system according to one embodiment of the present invention.

According to one embodiment of the present invention, an object region detection apparatus may be implemented by a computing system that includes at least one processor and a main memory for storing instructions which are executable by the processor.

As shown in FIG. 2, the image decoding unit 1000 including a variable length decoding unit 1100, an inverse quantization unit 1200, an inverse transform unit 1300, an adder unit 1400, and a prediction unit 1500 decodes the image data encoded in an image encoding scheme.

Figure 12:
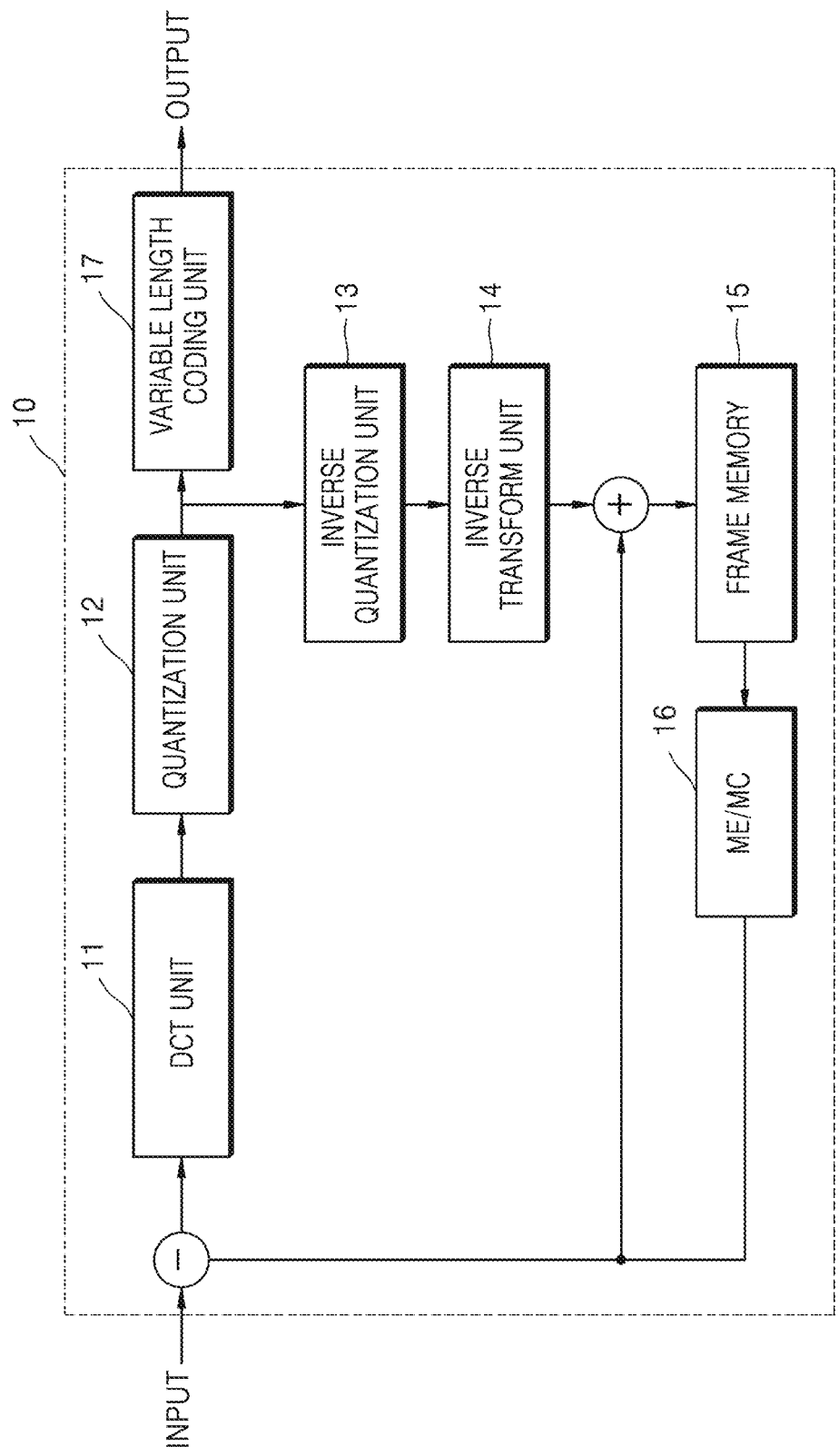
FIG. 12 is a view schematically showing an encoder system for generating an image to be encoded according to one embodiment of the present invention.

The image decoding unit 1000 may be configured according to a configuration of an encoding unit for encoding the image data. For example, the image decoding unit 1000 shown in FIG. 2 is configured to decode an image encoded according to FIG. 12, and FIGS. 2 and 12 are shown based on an H.264 codec in one embodiment of the present invention.

The variable length decoding unit 1100 may perform variable length decoding on inputted image data. Accordingly, the variable length decoding unit 111 may separate the image data into a motion vector, a quantization value, and a discrete cosine transform (DCT) coefficient, or may extract the motion vector, the quantization value, and the DCT coefficient from the image data.

The inverse quantization unit 1200 may perform inverse quantization on the DCT coefficient outputted from the variable length decoding unit 1100 according to the extracted quantization value.

The inverse transform unit 1300 may perform inverse discrete cosine transform (IDCT) on the DCT coefficient which is subject to the inverse quantization by the inverse quantization unit 1200 to obtain a difference value image.

The prediction unit 1500 may perform prediction according to whether a corresponding frame is an intra mode or an inter mode. A motion compensation unit 1530 of the prediction unit 1500 may compensate for a motion of current image data by using the motion vector and previous image data. Accordingly, the motion compensation unit may generate a prediction image.

The configuration of the variable length decoding unit 1100, the inverse quantization unit 1200, the inverse transform unit 1300, the adder unit 1400, and the prediction unit 1500 of the image decoding unit 1000 may be changed according to an encoding scheme of the image data or a codec, which can be implemented by those skilled in the art according to a codec of the image data. According to the present invention, the object region detection unit 2000 can be added to an existing decoding unit for decoding an image according to a protocol such as H.264.

The object region detection unit 2000 may obtain the object region information of the image based on data size information for a macroblock included in the image data and at least one image decoding parameter extracted by the image decoding unit 1000. The object region information obtained as described above may be transmitted to the image analysis unit 3000, and the image analysis unit 3000 may perform image processing only based on the object region information, so that an amount of computation required for the image analysis can be remarkably reduced.

Figure 3:
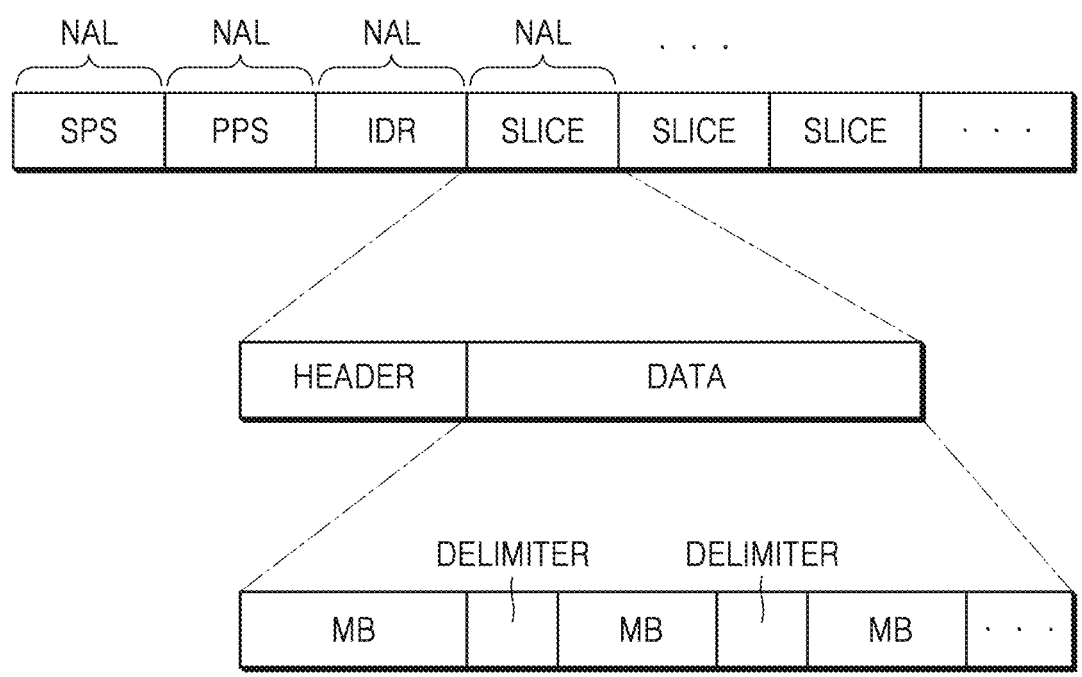
FIG. 3 is a view schematically showing a structure of a data stream of image data before decoding in a video codec using blocks based on a protocol such as H.264 according to one embodiment.

FIG. 3 is a view schematically showing a structure of a data stream of image data before decoding in a video codec using blocks according to a protocol such as H.264 according to one embodiment.

The data stream shown in FIG. 3 corresponds to image data which is inputted to the variable length decoding unit 1100 in FIG. 2, and stored or transmitted without being decoded at all. Such image data or data streams are composed of a network abstraction layer (NAL), and each NAL is composed of an NAL unit and a raw byte sequence payload (RBSP) as a payload. The NAL may correspond to a unit including parameter information such as SPS or PPS or a unit including slice data corresponding to a video coding layer (VCL).

A slice NAL corresponding to the VCL includes a header and data, wherein the data includes a plurality of macroblock fields and delimiter fields. In the present invention, the encoding scheme of the image data which is subject to object region detection is a scheme of encoding NAL-formatted data into a macroblock having a predetermined block size. In FIG. 3, a data field divided into macroblocks (MBs) is encoded with data of blocks of a predetermined size.

A first determination unit 2100 of the object region detection unit 2000, which will be described below, uses a data size of each of the macroblocks, that is, a size of a portion indicated by "MB" in FIG. 3 from the image data which is not subject to the decoding. According to such a scheme, an object region candidate can be preliminarily obtained by using original data before a primary decoding procedure performed by the variable length decoding unit 1100.

In a case of typical image data encoded based on the H.264 codec, an MB data field of FIG. 3 stores encoded data for a macroblock having a size of 16 pixels×16 pixels, and detailed block information of the macroblock may be checked by the variable length decoding unit 1100 in a partially encoded form.

Figure 4:
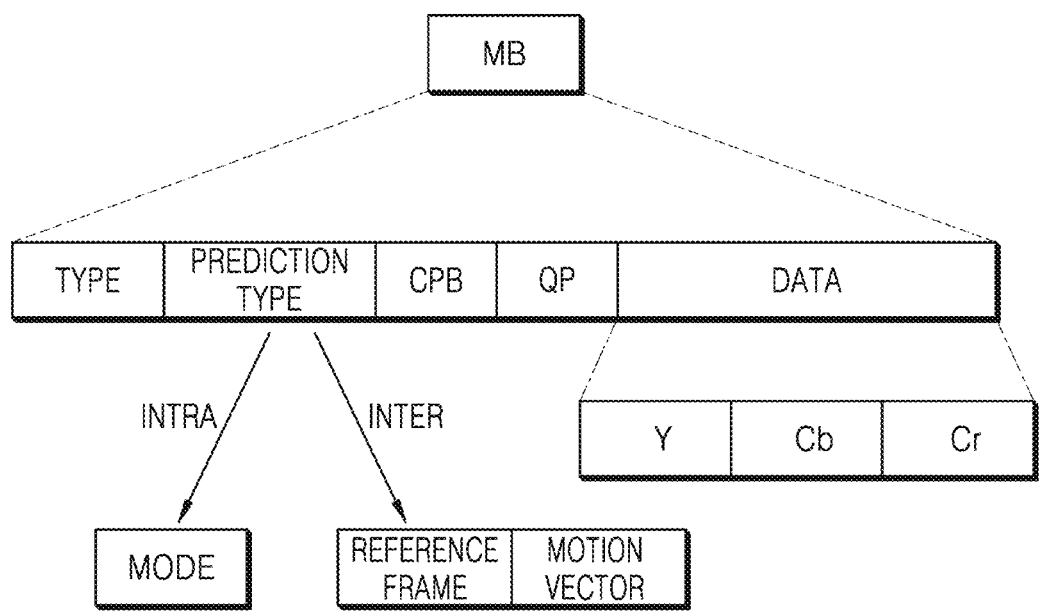
FIG. 4 is a view schematically showing a data field structure of a macroblock of the image data in a video codec using a variable block according to one embodiment.

FIG. 4 is a view schematically showing a data field structure of a macroblock of the image data in a video codec using a variable block according to one embodiment.

A data field of the macroblock shown in FIG. 4 is decoded by the variable length decoding unit 1100. Basically, the data field of the macroblock includes: a type field containing information such as a size of a block; a prediction type field including information on whether data is encoded in an intra mode or an inter mode, and including reference frame information and motion vector information when the encoding is performed in the inter mode; a coded picture buffer (CPB) field including information for maintaining a previous picture bit stream inputted during decoding; a quantization parameter (QP) field including information on a quantization parameter; and a DATA field including information on a DCT coefficient for a color of the block.

When a macroblock includes a plurality of sub-blocks, a plurality of data units of type-prediction type-CPB-QP-DATA shown in a second column of FIG. 4 are connected to each other.

A second determination unit 2200, which will be described below, detects the object region by using a block size, which is known from the type field of an entire macroblock decoded by the variable length decoding unit 1100 (when there is no sub-block) or a sub-block constituting the macroblock, and the motion vector information which is known from the prediction type field.

Meanwhile, color information of the DATA field includes information on colors in a plurality of systems (including color information in a YCbCr system in FIG. 4) in an encoded form. The color information of the DATA field may be decoded by the inverse quantization unit 1200 and the inverse transform unit 1300, and the adder unit 1400 may obtain prediction error information corresponding to a difference between a color value in the original image data and a color value predicted by the prediction unit 1500 of the image decoding unit 1000.

As described above, the prediction error information obtained by the adder unit 1400 may be used for detecting the object region by the second determination unit 2200.

Figure 5:
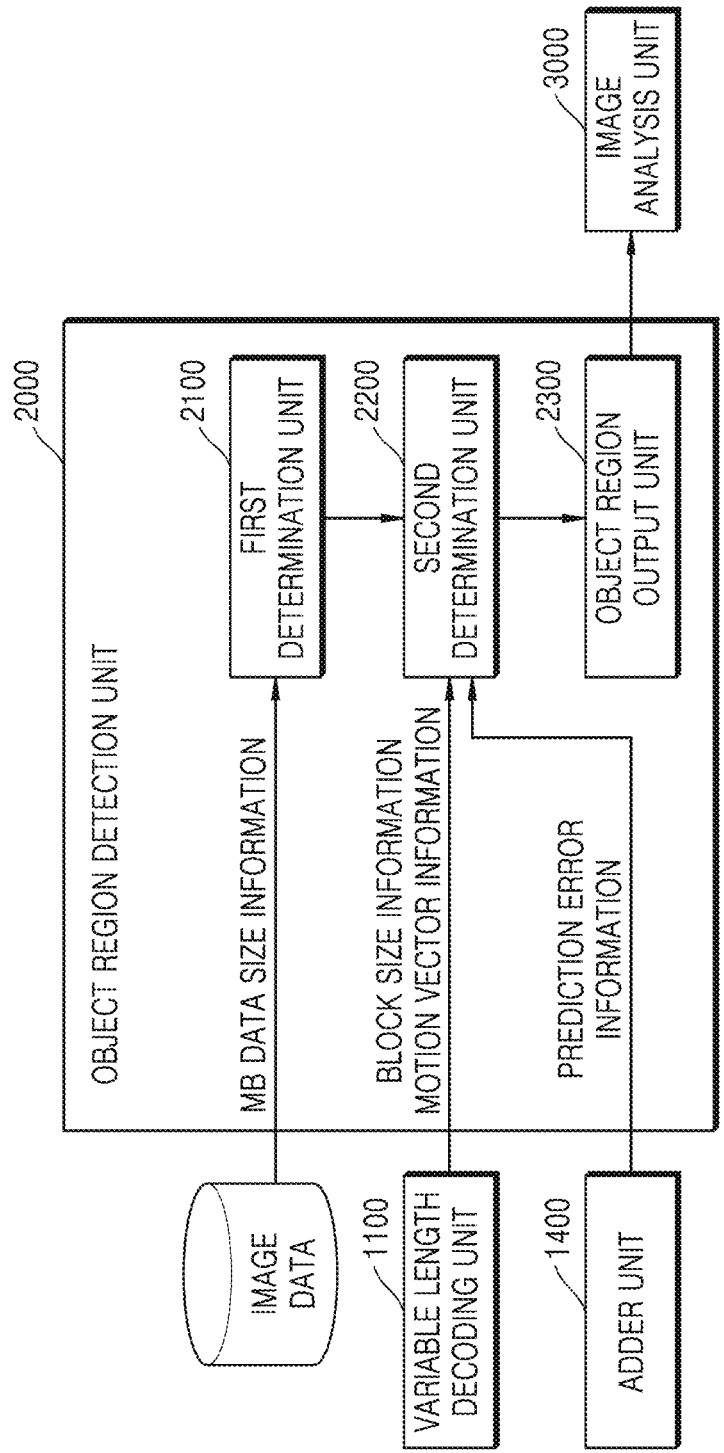
FIG. 5 is a view schematically showing a detailed configuration of an object region detection unit according to one embodiment of the present invention.

FIG. 5 is a view schematically showing a detailed configuration of an object region detection unit 2000 according to one embodiment of the present invention.

The object region detection unit 2000 includes: a first determination unit 2100 for extracting data size information for the macroblock from image data existing before a variable length decoding step is performed, and determining whether the data size information for the macroblock satisfies a predetermined criterion; a second determination unit 2200 for detecting an object region based on at least one image decoding parameter extracted by the image decoding unit 1000 for the macroblock having the data size information which is determined as to satisfy the predetermined criterion by the first determination unit 2100; and an object region output unit 2300 for outputting information of the object region detected by the second determination unit 2200 to the image analysis unit 3000.

As shown in FIG. 2, the first determination unit 2100 may obtain the data size information for each macroblock from an NAL-formatted data stream of image data which is not decoded by the variable length decoding unit 1100. In other words, it is determined whether each macroblock is a determination target of the second determination unit 2200, which will be described below, based on a data size of each data field indicated by "MB" in FIG. 3.

In an image encoding scheme using a variable size block, a macroblock (16×16) in which a complex image is positioned includes various information or is divided into a plurality of sub-blocks (8×8, 4×4, etc.), so that a size of the macroblock becomes large. In addition, in an image encoding scheme such as H.264, when there are frequently occurring values and values other than the frequently occurring values in data of the macroblock, encoding is performed to reduce an overall amount of data by assigning a short code to the frequently occurring values and assigning a long code to the values other than the frequently occurring values.

By using such characteristics of the encoding scheme using the variable size block, the first determination unit 2100 may obtain a data size of each macroblock from the image data before the decoding procedure performed by the variable length decoding unit 1100, and, when the data size satisfies the predetermined criterion, that is, when the data size is greater than or equal to a predetermined value, the obtained data size may be classified as the determination target by the second determination unit.

As described above, in the present invention, effective data for detecting the object region from the image data inputted to the image decoding unit 1000 is extracted without changing the image decoding unit 100 to determine the object region for the macroblock with a simple computation.

In another embodiment of the present invention, a determination result by the first determination unit 2100 and a determination result by the second determination unit 2200 are collectively determined to determine the object region for each of the macroblocks or sub-blocks.

Meanwhile, the second determination unit 2200 detects the object region based on the at least one image decoding parameter for the entire macroblock when the macroblock does not include a sub-block, and detects the object region based on the at least one image decoding parameter for the sub-block when the macroblock includes the sub-block.

In this case, the second determination unit 2200 may obtain the object region information based on at least one of block size information, motion vector information, and prediction error information for a target block, preferably, may obtain the object region information based on at least two of the block size information, the motion vector information, and the prediction error information for the target block, and most preferably, may obtain the object region information based on the block size information, the motion vector information, and the prediction error information for the target block.

In detail, the second determination unit 2200 may obtain the object region information based on evaluation results of at least one of the block size information, the motion vector information, and the prediction error information for the target block, preferably, may obtain the object region information by collecting the evaluation results of at least two of the block size information, the motion vector information, and the prediction error information for the target block, and most preferably, may obtain the object region information by collecting the evaluation results of the block size information, the motion vector information, and the prediction error information for the target block. In one embodiment of the present invention, the object region information may be obtained by performing scoring according to a predetermined criterion for each of the block size information, the motion vector information, and the prediction error information, obtaining a collective score by applying a weight or the like to evaluation scores of respective elements, and determining whether the obtained score satisfies a predetermined condition or value.

In one embodiment of the present invention, the at least one image decoding parameter includes the block size information of the macroblock or the sub-block constituting the macroblock. The block size information indicates whether the block has, for example, a size of 16×16, 8×8, or 4×4.

There is a high probability that a region where an object is present has a shape which is more complex than a shape of a background region. Meanwhile, in the image encoding scheme using a variable block, a macroblock having a complex shape is divided into a plurality of sub-blocks for the encoding. In one embodiment of the present invention, the second determination unit 2200 may perform the object region detection by using such encoding characteristics. In other words, when the size of the macroblock or the sub-block which is subject to object region determination becomes smaller, the second determination unit 2200 determines that there is a high probability that the macroblock or the sub-block corresponds to the object region, or provides the macroblock or the sub-block with a score higher than a score of a block with a small size for scores used for determining the object region.

In this case, as shown in FIG. 5, the block size information is obtained from information decoded by the variable length decoding unit 1100. In this manner, a parameter for detecting the object region can be obtained while maintaining the configuration of the image decoding unit 1000 without generating additional feature information for obtaining the object region.

In one embodiment of the present invention, the at least one image decoding parameter includes the motion vector information of the macroblock or the sub-block constituting the macroblock. A macroblock or a sub-block of a frame in the inter mode includes motion vector information (direction and size), respectively. The second determination unit 2200 determines whether the macroblock or the sub-block corresponds to the object region or determines a determination-related value based on size information of a motion vector among the motion vector information.

There is a high probability that the region where the object is present has a motion greater than a motion in the background region. Meanwhile, in the image encoding scheme using the variable block, each image block of the reference frame (e.g., a P frame) includes the size information of the motion vector for the reference frame. In one embodiment of the present invention, the second determination unit 2200 may perform the object region detection by using such encoding characteristics. In other words, when a size of a motion vector of the macroblock or the sub-block which is subject to the object region determination becomes larger, the second determination unit 2200 determines that there is a high probability that the macroblock or the sub-block corresponds to the object region, or provides the macroblock or the sub-block with a score higher than a score of a block with a small-sized motion vector for the scores used for determining the object region.

In this case, as shown in FIG. 5, the motion vector information is obtained from information decoded by the variable length decoding unit 1100. In this manner, a parameter for detecting the object region can be obtained while maintaining the configuration of the image decoding unit 1000 without generating additional feature information for obtaining the object region.

In one embodiment of the present invention, the at least one image decoding parameter includes the prediction error information of the macroblock or the sub-block constituting the macroblock.

The prediction error information is obtained in an adding step, and the prediction error information is obtained based on a difference between color information based on decoded image data for the macroblock or the sub-block constituting the macroblock and color information for the macroblock or the sub-block constituting the macroblock predicted in a prediction step performed in the adding step.

There is a high probability that the region where the object is present has an image color change or a morphological image change, and therefore, a size of the prediction error information may be large.

Preferably, in the present invention, the second determination unit 2200 detects the object region based on the prediction error information on Y color information corresponding to a brightness value (LUMA) region in a YCrCb color space.

In other words, when a size of the prediction error information on the Y color information of the macroblock or the sub-block which is subject to the object region determination becomes larger, the second determination unit 2200 determines that there is a high probability that the macroblock or the sub-block corresponds to the object region, or provides the macroblock or the sub-block with a score higher than a score of a block with small-sized prediction error information for the scores used for determining the object region.

As described above, the second determination unit 2200 determines whether the macroblock or the sub-block corresponds to the object region based on at least one value among the block size information, the motion vector information, and the prediction error information. The second determination unit 2200 may determine a final object region by determining the object region as the final object region when all pieces of information exceed a predetermined reference value, determining the object region as the final object region when each information exceeds a predetermined reference value by a predetermined number of times or more, or providing a score to each information according to a predetermined rule to determine the object region as the final object region when a collective score obtained from each score exceeds a predetermined reference value.

Meanwhile, a determination criterion or a reference value of the first determination unit 2100 and the second determination unit 2200 may be implemented by a statistical value obtained from the image, a statistical value obtained through the image processing performed by the system up to now, or an inputted value.

In a preferred embodiment of the present invention, the first determination unit 2100 primarily filters the determination target with the data size of the macroblock, and the second determination unit 2200 collectively determines the block size information, the motion vector information, and the prediction error information to determine a block corresponding to the object region. Therefore, the object region can be detected more accurately than in a case where only the motion vector is used at a minimum computation load.

In another embodiment of the present invention, the object region detection unit 2000 may obtain the object region by collecting the determination results of the first determination unit 2100 and the second determination unit 2200. In detail, the object region may be detected for the entire macroblock or the sub-block constituting the macroblock based on the score for the size information of the macroblock in the first determination unit 2100, and a determination score for at least one of the block size information, the motion vector information, and the prediction error information in the second determination unit 2200.

In another embodiment of the present invention, the object region detection unit 2000 may obtain the object region based on the determination result in the first determination unit 2100.

In another embodiment of the present invention, the object region detection unit 2000 may obtain the object region based on the determination result in the second determination unit 2200.

FIGS. 6A to 6D are views showing some examples of the macroblock.

Figure 6A:
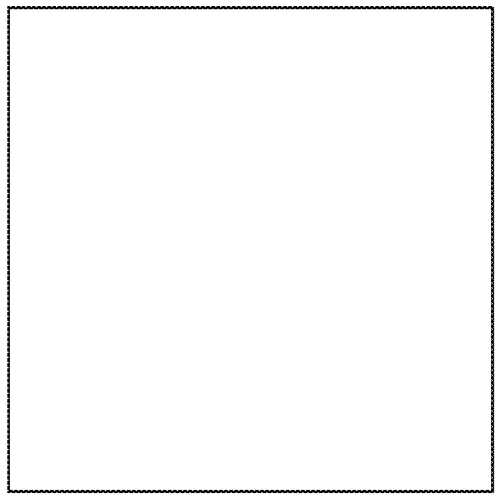
FIGS. 6A to 6D are views showing some examples of the macroblock.
Figure 6B:
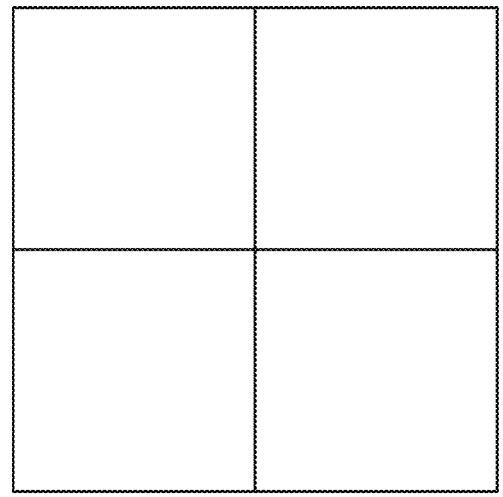
Figure 6C:
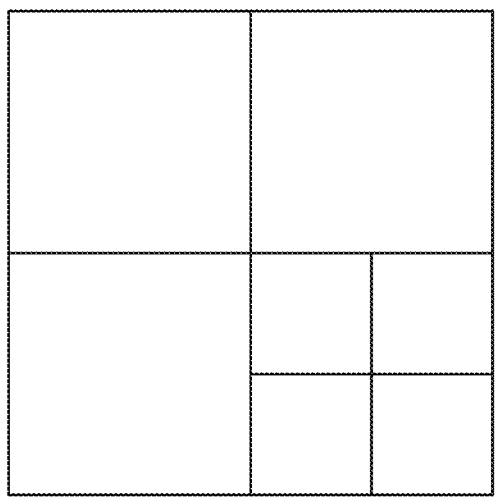
Figure 6D:
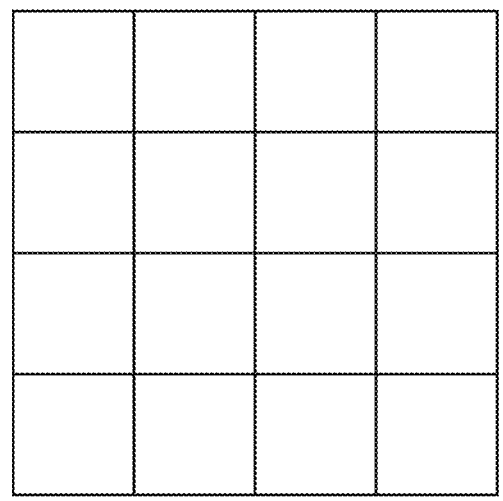

FIG. 6A is a view showing a case where a macroblock is composed of a single block, FIG. 6B is a view showing a case where the macroblock is composed of four blocks, FIG. 6C is a view showing a case where the macroblock is composed of seven blocks, and FIG. 6D is a view showing a case where the macroblock is composed of 16 blocks.

As described above, the first determination unit 2100 determines the data size information for each macroblock. Generally, there is a high probability that the data size of the macroblock composed of a plurality of sub-blocks as shown in FIG. 6D is higher than the data size of the macroblock as shown in FIG. 6A. The first determination unit 2100 may perform the determination in a direction in which the macroblock as shown in FIG. 6D is more likely to correspond to the object region than the macroblock as shown in FIG. 6A.

Meanwhile, the block size of the sub-block in FIG. 6D is smaller than the block size of the sub-block in FIG. 6B or the entire macroblock in FIG. 6A. Therefore, the second determination unit 2200 may perform the determination in a direction in which the sub-block in FIG. 6D is more likely to correspond to the object region than the sub-block in FIG. 6B or the entire macroblock in

FIG. 6A.

Figure 7:
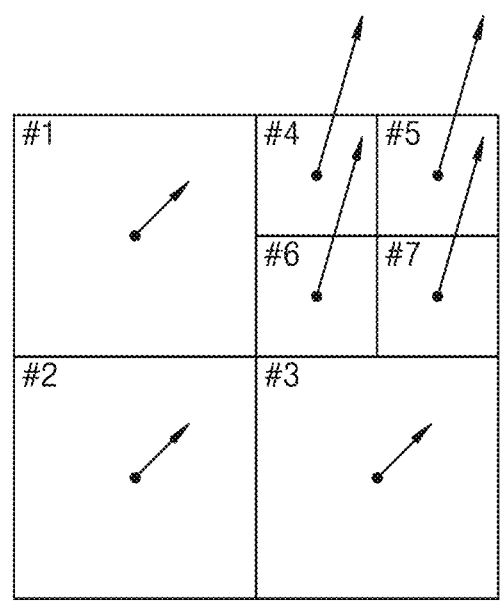
FIG. 7 is a view showing an example of a macroblock including a sub-block.

FIG. 7 is a view showing an example of a macroblock including a sub-block.

In the encoding of the image data by using the variable size block, each of the sub-blocks in an identical macroblock may have different block sizes and different motion vectors as shown in FIG. 7.

Blocks #4, #5, #6, and #7 in FIG. 7 have smaller block sizes and larger motion vectors than blocks #1, #2, and #3. Therefore, the second determination unit 2200 may provide higher scores for determining whether the block corresponds to the object region to the blocks #4, #5, #6, and #7 than the blocks #1, #2, and #3.

FIGS. 8A to 8C are views illustrating a process of an object region detection step based on blocks according to one embodiment of the present invention.

FIG. 8A is a view showing 16 macroblocks.

FIG. 8B is a view showing a state in which a first determination step including extracting the data size information for the macroblock from image data existing before the variable length decoding step is performed, and determining whether the data size information for the macroblock satisfies the predetermined criterion is performed. A portion indicated by a dotted line in FIG. 8B corresponds to macroblocks having data sizes less than a predetermined value, and a portion indicated by a solid line in FIG. 8B corresponds to macroblocks having data sizes greater than or equal to the predetermined value.

FIG. 8C is a view showing a state in which a second determination step of detecting the object region based on the at least one image decoding parameter extracted by the image decoding unit 1000 for the macroblock (a solid line region in FIG. 8B) having the data size information which is determined as to satisfy the predetermined criterion in the first determination step is performed.

A portion indicated by a dotted line in FIG. 8C corresponds to blocks which do not satisfy the predetermined criterion in the second determination step, and a portion indicated by a solid line in FIG. 8C corresponds to sub-blocks or macroblocks satisfying the predetermined criterion in the second determination step.

In one preferred embodiment of the present invention, a part of the macroblocks are excluded from the determination target of the second determination unit 2200 by the first determination unit 2100, and the determination of the second determination unit 2200 is performed only for the macroblocks satisfying the criterion of the first determination unit 2100, so that the amount of computation in the object region detection step can be further reduced, and as a result, an overall image processing speed can be improved.

Figure 9:
FIG. 9 is a view illustrating block division information for an image screen according to one embodiment of the present invention.

FIG. 9 is a view illustrating block division information for an image screen according to one embodiment of the present invention.

As shown in FIG. 9, in the region where the object is present, it is found that each macroblock is divided into smaller sub-blocks, and the second determination unit 2200 determines whether the sub-block or the macroblock corresponds to the object region by reflecting such characteristics.

Figure 10:
FIG. 10 is a view illustrating motion vector information for the image screen according to one embodiment of the present invention.

FIG. 10 is a view illustrating motion vector information for the image screen according to one embodiment of the present invention.

As shown in FIG. 10, in the region where the object is present, it is found that a size of a motion vector of each macroblock or each sub-block is increased, and the second determination unit 2200 determines whether the sub-block or the macroblock corresponds to the object region by reflecting such characteristics.

Figure 11:
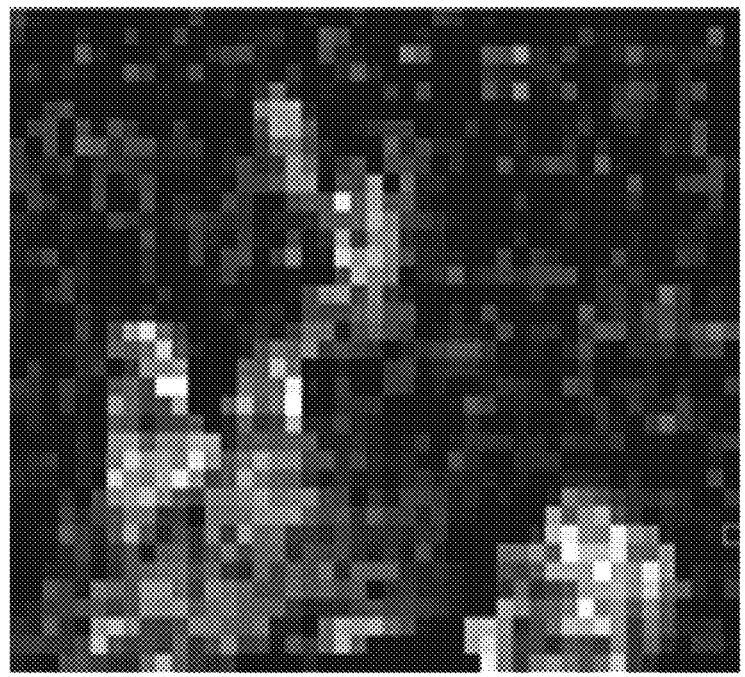
FIG. 11 is a view illustrating prediction error information for the image screen according to one embodiment of the present invention.

FIG. 11 is a view illustrating prediction error information for the image screen according to one embodiment of the present invention.

As shown in FIG. 11, in the region where the object is present, it is found that a value of prediction error information of each macroblock or each sub-block is increased (in FIG. 11, the prediction error information for a Y value corresponding to a brightness value in the YCrCb color space is represented, based on a numerical value, as bright when the numerical value is large and dark when the numerical value is small), and the second determination unit determines whether the sub-block or the macroblock corresponds to the object region by reflecting such characteristics.

FIG. 12 is a view schematically showing an encoder system for generating an image to be encoded according to one embodiment of the present invention.

According to one embodiment of the present invention, the object region detecting unit and the image decoding unit as described above may be utilized for the image data encoded by using the variable size block as shown in FIGS. 6A to 6D. As a representative example, the object region detecting unit and the image decoding unit may be utilized for the image data encoded by the H.264 codec.

In order to generate data shown as the image data in FIGS. 1 and 2, an encoder 10 shown in FIG. 12 may include a discrete cosine transform (DCT) unit 11, a quantization unit 12, an inverse quantization (IQ) unit 13, an inverse discrete cosine transform (IDCT) unit 14, a frame memory 15, a motion estimation and compensation (ME/MC) unit 16, and a variable length coding (VLC) unit 17. Similarly, the image decoding unit is preferably configured to correspond to a configuration of the encoding unit.

To give a brief description about the above configuration, the DCT unit 11 may perform a DCT computation on image data inputted in units of pixel blocks with a predetermined size (e.g., 4×4) to remove spatial correlation.

Thereafter, the quantization unit 12 may perform quantization on a DCT coefficient obtained by the DCT unit 11 to express the DCT coefficient in several representative values, so that the quantization unit 12 may perform high-efficiency loss compression.

In addition, the inverse quantization unit 13 may perform inverse quantization on the image data quantized by the quantization unit 12.

The inverse transform unit 14 may perform IDCT transform on the image data which is subject to the inverse quantization by the inverse quantization unit 13.

The frame memory 15 stores the image data which is subject to the IDCT transform by the inverse transform unit 14 in units of frames.

Meanwhile, the motion estimation and compensation unit 16 estimates a motion vector (MV) per macroblock to calculate a sum of absolute difference (SAD) corresponding to a block matching error by using inputted image data of a current frame and image data of a previous frame stored in the frame memory 15.

The variable length coding unit 17 removes statistical redundancy in the data, which is subject to the DCT and quantization, according to the motion vector estimated by the motion estimation and compensation unit 16.

FIGS. 13A to 13C are views schematically showing examples of frames of the image data.

A video part of a typical moving image includes an I frame (a frame indicated by "I" in FIGS. 13A to 13C), a P frame (a frame indicated by "P" in FIGS. 13A to 13C), and a B frame (a frame indicated by "B" in FIGS. 13A to 13C).

The I frame is a key frame that includes an entire image, may function as an access point in a moving image file, corresponds to an independently encoded frame, and has a low compression rate.

Meanwhile, the P frame is a frame generated by forward prediction with reference to a previous I frame or a previous P frame, and does not correspond to the independently encoded frame. The P frame has a higher compression rate than the I frame. In this case, a "previous" frame indicates one of a plurality of frames existing before a corresponding frame as well as a frame existing directly before the corresponding frame, and a "subsequent" frame indicates one of a plurality of frames existing after the corresponding frame as well as a frame existing directly after the corresponding frame.

Meanwhile, the B frame is a frame generated by forward and backward prediction with reference to a previous frame and a subsequent frame, and does not correspond to the independently encoded frame. The B frame has a higher compression rate than the I and P frames. Therefore, the independently encoded frame corresponds to the I frame, and a dependently encoded frame may correspond to the remaining B or P frame.

The B and P frames correspond to a reference frame, and preferably, the object region detection unit may perform the object region detection on the reference frame.

Figure 14:
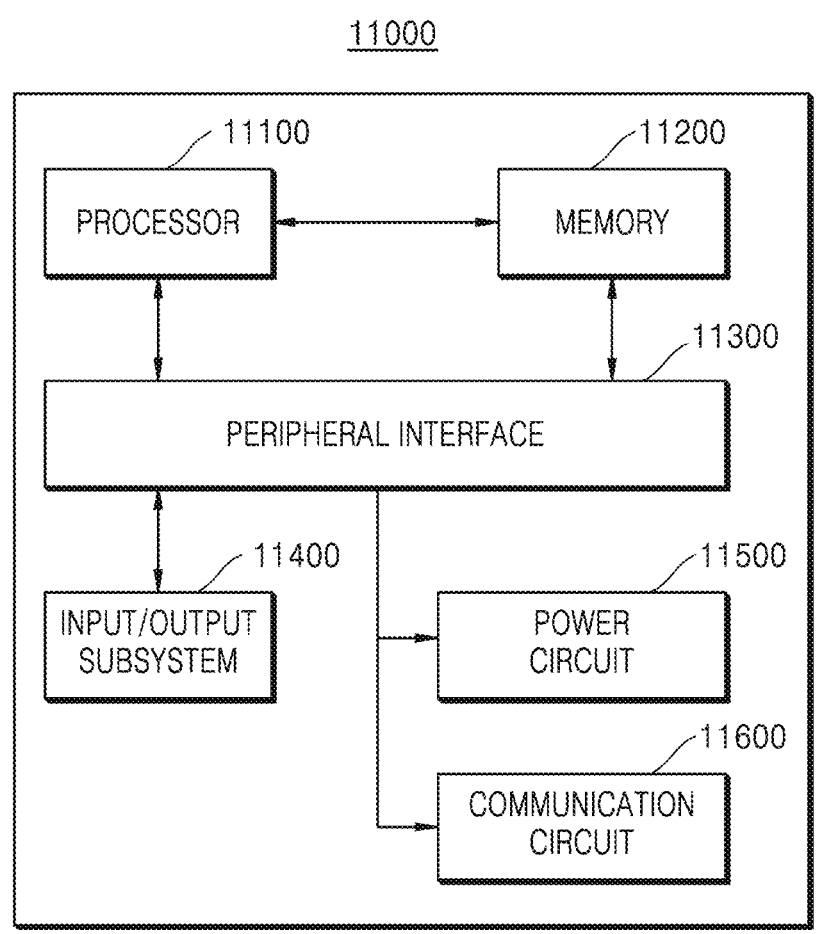
FIG. 14 is a view for describing an example of an internal configuration of a computing device according to one embodiment of the present invention.

FIG. 14 is a block diagram for describing an example of an internal configuration of a computing device according to an embodiment of the present invention. All or some of the components shown in FIG. 2 may include components of the computing device which will be described below.

As shown in FIG. 14, the computing device 11000 may include at least one processor 11100, a memory 11200, a peripheral interface 11300, an I/O subsystem 11400, a power circuit 11500, and a communication circuit 11600. Herein, the computing device 11000 may correspond to a user terminal A connected to the tactile interface device or correspond to the above-mentioned computing device B.

The memory 11200 may include, for example, a high-speed random access memory, a magnetic disk, an SRAM, a DRAM, a ROM, a flash memory and a nonvolatile memory. The memory 11200 may include software modules, instruction sets, or various other data required for an operation of the computing device 11000.

Herein the access to the memory 11200 from other components of the processor 11100 or the peripheral interface 11300 may be controlled by the processor 11100.

The peripheral interface 11300 may combine an input and/or output peripheral device of the computing device 11000 to the processor 11100 and the memory 11200. The processor 11100 executes the software module or the instruction set stored in memory 11200, thereby performing various functions for the computing device 11000 and processing data.

The I/O subsystem 11400 may combine various input/output peripheral devices to the peripheral interface 11300. For example, the I/O subsystem 11400 may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem 11400.

The power circuit 11500 may provide power to all or a portion of the components of the terminal. For example, the power circuit 11500 may include a power management system, at least one power source such as a battery or an alternating current (AC), a charging system, a power failure detection circuit, a power converter or inverter, a power status indicator, and any other components for generating, managing, and distributing the power The communication circuit 11600 uses at least one external port, thereby enabling communication with other computing devices.

Alternatively, as described above, the communication circuit 11600 may include an RF circuit, if needed, to transmit and receive an RF signal, also known as an electromagnetic signal, thereby enabling communication with other computing devices.

The above embodiment of FIG. 14 is merely an example of the computing device 11000. In the computing device 11000, some components shown in FIG. 14 may be omitted, additional components not shown in FIG. 14 may be further provided, or a configuration or arrangement for combining at least two components may be provided. For example, a computing device for a communication terminal in a mobile environment may further include a touch screen, a sensor, and the like in addition to the components shown in FIG. 18, and the communication circuit may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. Particularly, a program according to the embodiment may be configured as a PC-based program or an application dedicated to a mobile terminal. The application to which the present invention is applied may be installed in the user terminal through a file provided by a file distribution system. For example, the file distribution system may include a file transmission unit (not shown) for transmitting the file according to a request of the user terminal.

The above-mentioned device may be implemented by hardware components, software components, and/or a combination of the hardware components and the software components. For example, the devices and components described in the embodiments may be implemented by using at least one general purpose computer or special purpose computer such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. In some cases, one processing device is used for the further understanding. However, it will be appreciated by those skilled in the art that the processing device may include a plurality of processing elements and/or a plurality of types of processing elements. For example, the processing device may include a plurality of processors or one processor and one controller. In addition, other processing configurations, such as a parallel processor, may be possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage media or device, or in a signal wave to be transmitted. The software may be distributed over computing devices connected to networks, thereby being stored or executed in a distributed manner.

The software and data may be stored in at least one computer-readable recording media.

The method according to the embodiment may be implemented in the form of a program instruction that may be executed through various computer mechanisms, thereby being recorded in a computer-readable medium. The computer-readable medium may include program instructions, data files, data structures, and the like, independently or in combination thereof. The program instructions recorded in the medium may be specially designed and configured for the embodiment, or may be known to those skilled in the art of computer software so as to be used. An example of the computer-readable medium includes a hard disk, a magnetic media such as a floppy disk and a magnetic tape, an optical media such as a CD-ROM and a DVD, a magneto-optical media such as a floptical disk, and a hardware device specially configured to store and execute a program instruction such as ROM, RAM, and flash memory. An example of the program instruction includes a high-level language code to be executed by a computer using an interpreter or the like, as well as a machine code generated by a compiler. The above hardware device may be configured to operate as at least one software module to perform the operations of the embodiments, and vice versa.

Although the above embodiments have been described with reference to the limited embodiments and drawings, however, it will be understood by those skilled in the art that various changes and modifications may be made from the above-mentioned description. For example, even though the described descriptions are performed in an order different from the described manner, and/or the described components such as system, structure, device, and circuit are coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. An object region detection method performed in a computing system including at least one processor and a main memory for storing instructions which are executable by the processor, the object region detection method comprising:
   an image decoding step of decoding an image by performing a variable length decoding step, an inverse quantization step, an inverse transform step, and an adding step on image data; and
   an object region detection step of obtaining object region information of the image based on data size information for a macroblock included in the image data and at least one image decoding parameter extracted in the image decoding step,
   wherein the object region detection step comprises:
   a first determination step including extracting the data size information indicating a size of data included in the macroblock from image data existing before the variable length decoding step is performed, and determining whether the size of data included in the macroblock is greater than a predetermined criterion; and
   a second determination step of detecting an object region based on the at least one image decoding parameter extracted in the image decoding step only for the macroblock having the size of data, which is determined as to be greater than the predetermined criterion in the first determination step,
   wherein the second determination step comprises detecting the object region based on the at least one image decoding parameter, which includes motion vector information of each sub-block of a plurality of sub-blocks included in the macroblock.

2. The object region detection method of claim 1, wherein the second determination step further comprises:
   detecting the object region based on the at least one image decoding parameter, which includes motion vector information of an entire macroblock does not include any sub-block.

3. The object region detection method of claim 1, wherein the motion vector information is obtained from information decoded in the variable length decoding step.

4. The object region detection method of claim 1, wherein the at least one image decoding parameter includes prediction error information of the macroblock or a sub-block constituting the macroblock.

5. The object region detection method of claim 4, wherein the prediction error information is obtained in the adding step, and
   the prediction error information is obtained based on a difference between color information based on decoded image data for the macroblock or the sub-block constituting the macroblock and color information for the macroblock or the sub-block constituting the macroblock predicted in a prediction step performed in the adding step.

6. The object region detection method of claim 1, wherein the object region detection step comprises obtaining the object region information based on the motion vector information and prediction error information.

7. The object region detection method of claim 6, wherein the object region detection step comprises obtaining the object region information by collecting evaluation results of the motion vector information and the prediction error information for a target block.

8. The object region detection method of claim 1, wherein the at least one image decoding parameter includes information indicating a block size of the macroblock.

9. The object region detection method of claim 1, wherein the extracting the data size information for the macroblock comprises:
   extracting the data size information for the macroblock from a network abstraction layer (NAL)-formatted data stream of the image data which is not decoded by the variable length decoding step.

10. An object region detection method performed in a computing system including at least one processor and a main memory for storing instructions which are executable by the processor, the object region detection method comprising:
    an image decoding step of decoding an image by performing a variable length decoding step, an inverse quantization step, an inverse transform step, and an adding step on image data; and
    an object region detection step of obtaining object region information by at least one of motion vector information and prediction error information of a macroblock or a sub-block constituting the macroblock when data size information for the macroblock included in the image data satisfies a predetermined criterion,
    wherein the object region detection step comprises:
    a first determination step including extracting the data size information indicating a size of data included in the macroblock from image data existing before the variable length decoding step is performed, and determining whether the size of data included in the macroblock is greater than the predetermined criterion; and
    a second determination step of detecting an object region based on the at least one image decoding parameter extracted in the image decoding step only for the macroblock having the size of data, which is determined as to be greater than the predetermined criterion in the first determination step, wherein the second determination step comprises detecting the object region based on the at least one image decoding parameter, which includes the motion vector information of each sub-block of a plurality of sub-blocks included in the macroblock.

11. The object region detection method of claim 10, wherein the at least one image decoding parameter includes information indicating a block size of the macroblock.

12. The object region detection method of claim 10, wherein the extracting the data size information for the macroblock comprises:

extracting the data size information for the macroblock from a network abstraction layer (NAL)-formatted data stream of the image data which is not decoded by the variable length decoding step.

13. An object region detection apparatus including at least one processor and a main memory for storing instructions which are executable by the processor, the object region detection apparatus comprising:

an image decoding unit including a variable length decoding unit, an inverse quantization unit, an inverse transform unit, and an adder unit for performing a variable length decoding step, an inverse quantization step, an inverse transform step, and an adding step on image data, respectively, to decode an image; and an object region detection unit for obtaining object region information of the image based on data size information for a macroblock included in the image data and at least one image decoding parameter extracted by the image decoding unit, wherein the object region detection unit is configured to execute instructions for performing:

a first determination step including extracting the data size information indicating a size of data included in the macroblock from image data existing before variable length decoding by the variable length decoding unit is performed, and determining whether the size of data included in the macroblock is greater than a predetermined criterion; and a second determination step of detecting an object region based on the at least one image decoding parameter extracted in the image decoding step only for the macroblock having the size of data, which is determined as to be greater than the predetermined criterion in the first determination step, wherein the second determination step comprises detecting the object region based on the at least one image decoding parameter, which includes the motion vector information of each sub-block of a plurality of sub-blocks included in the macroblock.

14. The object region detection apparatus of claim 13, wherein the at least one image decoding parameter includes information indicating a block size of the macroblock.

15. The object region detection apparatus of claim 13, wherein the object region detection unit is further configured to execute instructions for performing:

extracting the data size information for the macroblock from a network abstraction layer (NAL)-formatted data stream of the image data which is not decoded by the variable length decoding step.

* * * * *